United States Patent [19]

Kuribayashi

[11] Patent Number: 4,605,951
[45] Date of Patent: Aug. 12, 1986

[54] APPARATUS FOR CONVERTING FIELD VIDEO SIGNALS INTO FRAME VIDEO SIGNALS

[75] Inventor: Michio Kuribayashi, Kaisei, Japan
[73] Assignee: Fuji Photo Film Co., Ltd., Kanagawa, Japan
[21] Appl. No.: 658,439
[22] Filed: Oct. 5, 1984
[30] Foreign Application Priority Data Oct. 13, 1983 [JP] Japan ................................ 58-189832

[51] Int. Cl.[4] .................... H04N 11/20; H04N 11/22; H04N 9/80
[52] U.S. Cl. ........................................ 358/11; 358/313
[58] Field of Search .................. 358/11, 17, 19, 21 R, 358/25, 313, 328, 23; 360/11.1

[56] References Cited

U.S. PATENT DOCUMENTS 3,886,589  5/1975  Nasu ................................... 360/11.1
4,152,719  5/1979  Kellar ................................. 358/22
4,247,865  1/1981  Mastronardi ......................... 358/17
4,298,896  11/1981 Heitmann ............................. 358/313

FOREIGN PATENT DOCUMENTS 61906  5/1977  Japan .................................. 360/11.1

Primary Examiner—John W. Shepperd
Attorney, Agent, or Firm—Birch, Stewart, Kolasch & Birch

[57] ABSTRACT

An apparatus for converting field video signals into frame video signals includes a modulation circuit for modulating a chrominance subcarrier with a color signal contained in a field video signal, a signal composing circuit for combining the modulated subcarrier with a luminance signal of the field video signal, and a signal converter circuit means for producing a frame video signal including interlaced fields with a time delay applied to alternative one of the fields of the output signals delivered from the signal composing circuit. The time delay is substantially equal in period to half a horizontal scanning time period. The apparatus further includes a signal generator responsive to a first signal which is substantially equal in frequency to the chrominance subcarrier for generating a second signal which is shifted in phase by substantially 90 degrees with respect to the first signal, and a changeover switch for alternately selecting the first and second signals for each field to supply the modulator circuit with either the first or second signal as the chrominance subcarrier.

4 Claims, 7 Drawing Figures

APPARATUS FOR CONVERTING FIELD VIDEO SIGNALS INTO FRAME VIDEO SIGNALS

BACKGROUND OF THE INVENTION

1. Field of the Invention

The present invention relates to an apparatus for converting video signals, and in particular, to an apparatus for converting field video signals into frame video signals.

2. Description of the Prior Art

It has been well known in the art that interlaced scanning is utilized for video signals such as television signals undergoing raster scanning. In the standard color television signal system of NTSC, for example, an interlaced scanning is conducted to form a frame including a couple of fields.

When recording video signals on a rotating recording medium such as a magnetic disk, a recording scheme, that is, so-called "field recording" is used in some cases in which either one of an odd-numbered field or even-numbered field is recorded on a track of the rotating recording medium. In order to reproduce such field video signals obtained by the field recording and to display the reproduced signals on a video monitor screen, the field video signals must be converted into frame video signals in conformity with the standard signal format.

In a playback system in which video signals are repetitiously read from the same field on a disk track, such field video signals are successively read on a time-serial basis. On the other hand, the interlaced scanning is executed in the standard signal system; consequently, in order to generate two interlaced fields constituting a frame from video signals recorded in the same field, the video signals in an even-numbered field must have a delay, a period of which is equivalent to one half a horizontal scanning period (1H) with respect to those in an associated odd-numbered field.

In more detail, referring to FIG. 1, horizontal scanning lines of odd-numbered and even-numbered fields are depicted with solid and dotted lines, respectively. As can be understood from these lines, if a frame comprises 525 horizontal scanning lines, for example, the odd-numbered field terminates at the center of 263rd scanning line #263H, that is, 262.5H, which is followed by the even-numbered field. To generate a proper picture with the even-numbered field arranged in the horizontal scanning line #264 beginning from the top thereof, the contents of video signals written in #264H must correctly correspond to those of video signals recorded in #1H. Field video signals supplied from a magnetic disk return from position 262.5H to position 0.5H which is the top of horizontal line #1H. To obtain such an appropriate correspondence, the video signals in the even-numbered field must be delayed with respect to those in the odd-numbered field by a time period substantially equal to one half of a horizontal scanning period, 1H.

Field video signals obtained from a magnetic disk are ordinarily separated into luminance (Y) signals and chroma (C) signals according to the line sequential color television system; which are then demodulated. Therefore, the 0.5H delay and the changeover operation for each field must be conducted for both Y and C signals.

Above-mentioned operations require two delay circuit systems and two changeover circuit systems, so complex circuit configuration is unavoidable; furthermore, difference in circuit gain between a signal passed through a 0.5H delay circuit and a signal not passed therethrough causes flicker in the reproduced picture at a frequency equal to one half the vertical scanning frequency fv. Consequently, a complex, difficult circuit adjustment is necessitated to remove such a flicker from the picture.

To avoid the difficulty in adjusting circuits to prevent the flicker, it is only necessary to arrange a delay circuit and a changeover circuit on the output section to which a composite color video signal is delivered. That is, color difference signals, such as R-Y and B-Y signals are generated from the chroma signal in the line sequential color television system to conduct the balanced modulation on the chrominance subcarrier, and the resultant signal is then combined with the luminance signal. Afterwards, the thus obtained composite signal need only be delivered to a 0.5H delay circuit and a odd-numbered/even-numbered field changeover circuit.

In such a circuit configuration, however, if the signals which do not pass the delay circuit are recorded in odd-numbered fields, the phase of chrominance signal written in an even-numbered field is advanced by 90° with respect to that in the associated odd-numbered field. In an automatic phase control circuit of the video playback monitor, the synchronization of color signals (color lock) is lost at the beginning of each field. Therefore, the hue is changed so that a false color appears at the top portion of a reproduced image of each field. This phenomenon is magnified and is clearly developed in a hardcopy image such as a printed picture, thereby bringing forth a disadvantageous feature in practical use. In a monochrome video monitor, the chrominance signals are generally not removed from the luminance signals. When video signals including chrominance signals whose phase is shifted as described above (which causes the charge in hue) are reproduced on such a monochrome video monitor, fluctuation in the luminance due to chrominance signals is not cancelled for each frame. Consequently, dots having brightness associated with the waveforms of respective chrominance signals appear in a reproduced picture.

SUMMARY OF THE INVENTION

It is therefore an object of the present invention to provide an apparatus for converting field video signals into frame video signals, which are free from desynchronization of the color signal due to phase variation in the chrominance signal, through a simple adjustment for suppressing flicker in the reproduced picture, thereby removing above-stated drawbacks of the prior art.

In accordance with the present invention, there is provided an apparatus for converting field video signals into frame video signals, comprising: modulator means for modulating a chrominance subcarrier with a color signal included in a field video signal; signal composing means for combining the modulated subcarrier with a luminance signal included in the field video signals; convertor means for producing a frame video signal including interlaced fields with a time delay applied to alternative one of the fields of the output signals delivered from said signal composing means, said time delay being substantially equal in period to half a horizontal scanning time period of the fields; signal generator means responsive to a first signal which is substantially equal in frequency to the chrominance subcarrier for generating a second signal which is shifted in phase by substantially 90 degrees with respect to said first signal, and switching means for alternately selecting said first and second signals for each field to supply said modulator circuit means with the selected one of said first and second signals as the chrominance subcarrier.

BRIEF DESCRIPTION OF THE DRAWINGS

The object and features of the present invention will become more apparent from the consideration of the following detailed description taken in conjunction with the accompanying drawings in which:

FIG. 3 shows a chrominance subcarrier fsc received on a terminal 38, FIG. 4 illustrates a chrominance subcarrier fsc1 delivered from a phase shift 44, FIG. 5 depicts a chrominance subcarrier delivered to a balanced modulator, FIG. 6 illustrate a chrominance signal transmitted from a terminal 48, and FIG. 7 shows a chrominance signal obtained by blanking a signal marked with #263 in FIG. 6.

DESCRIPTION OF THE PREFERRED EMBODIMENT

With reference to the accompanying drawings, an embodiment of apparatus for converting field video signals into frame video signals will be described in detail according to the present invention.

Figure 2:
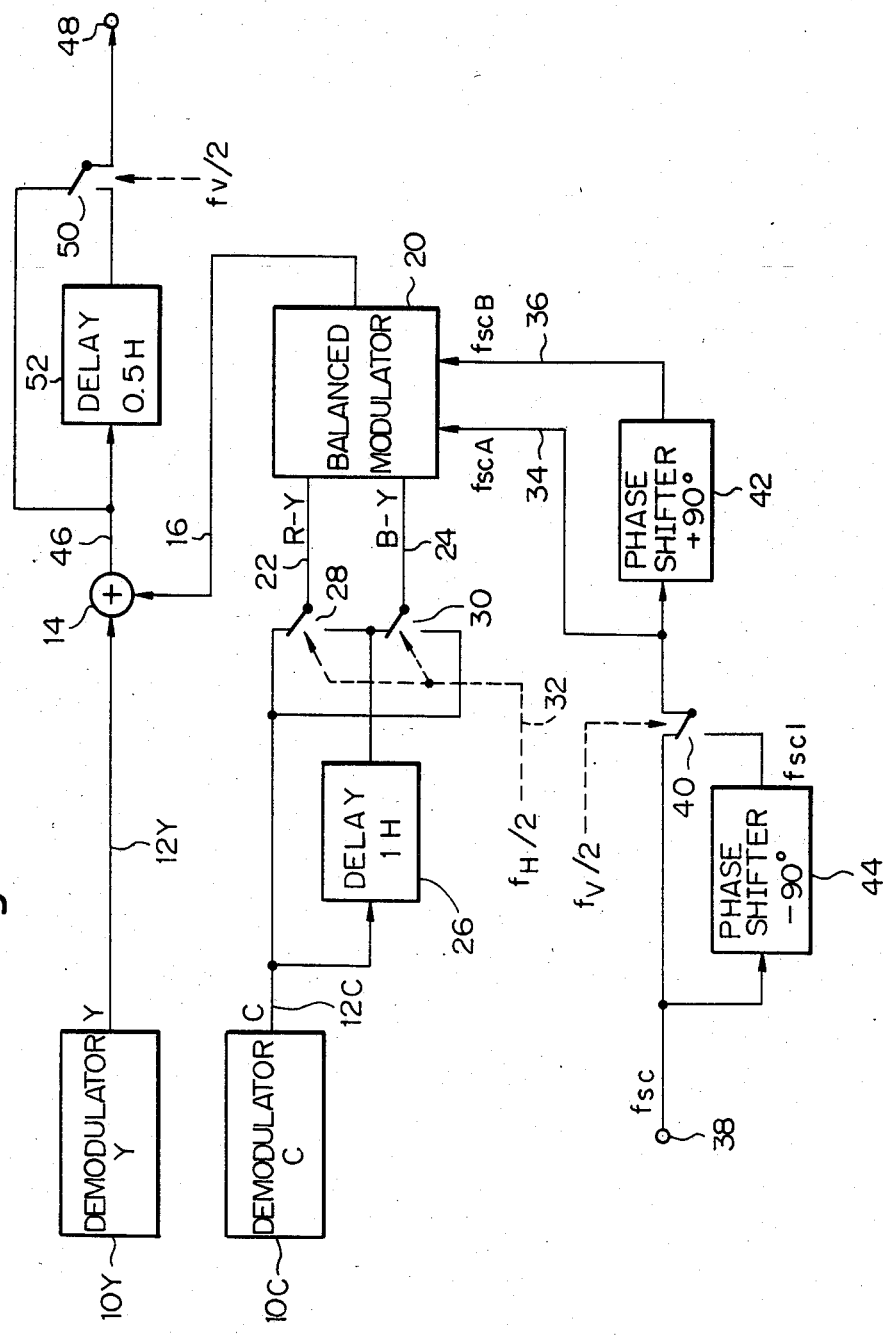
FIG. 2 is a schematic block diagram depicting an embodiment of an apparatus for converting field video signals into frame video signals in accordance with the present invention.

Referring to FIG. 2, there are provided two demodulators a demodulator 10Y for receiving and demodulating a luminance signal (Y) included in a video signal written on a rotating recording medium such as a magnetic disk according to the field recording scheme, and a demodulator 10C for receiving and demodulating a chroma (C) signal which is generated in accordance with the line sequential color television system and which is included in the video signal. The demodulator 10Y has a Y output 12Y connected to one of the inputs to an adder of a signal composing circuit 14, while the other adder input 16 is connected to an output of a balanced modulator 20.

The balanced modulator 20 has inputs 22 and 24 to which color difference signals, for example, R-Y and B-Y are supplied, respectively, which are fed from the output 12C of the demodulator 10C through a delay circuit 26 as well as changeover switches 28 and 30. The delay circuit 26 provides a delay time substantially equal to a horizontal scanning (1H) time period. The changeover switches 28 and 30 operate in synchronism with a signal whose frequency is set to be substantially equal to half the frequency fH of the horizontal sync signal illustrated with dotted lines 32 so as to alternately establish a connecting state shown in FIG. 2 and the other connecting state, opposite to the depicted state, at an interval of 1H time period, thereby generating the color difference signals.

In the balanced modulator 20, these color difference signals undergo a balanced modulation by use of chrominance subcarriers. A subcarrier fscA whose phase is shifted by 90 degrees with respect to that of a subcarrier fscB supplied to a subcarrier input terminal 36 is delivered to a subcarrier input terminal 34. In more detail, a subcarrier having a frequency fsc is received on an input terminal 38, and is then passed through a changeover switch 40 to an input terminal 34 of the balanced modulator. In addition, it is delivered as a subcarrier fscB to an input terminal 36 of the balanced modulator 20 via the changeover switch 40 and a phase shifter 42 having a phase shift angle of 90 degrees. On the other hand, the subcarrier fsc is transferred to a phase shifter with a phase shift angle of −90 degrees, and the resultant signal whose phase has been shifted by −90 degrees is supplied as a signal fsc1 to the switch 40. The changeover switch 40 can alternately establish the connecting state depicted in FIG. 2 and the other connecting state, opposite thereto, for every other field in response to a frequency equal to half the frequency fV of a vertical sync signal. These subcarriers fscA and fscB transferred to the balanced modulator 22 undergo the balanced demodulation with the color difference signals received on the inputs 22 and 24 so as to be supplied as a color signal to the input 16 of the signal composing circuit 14, as will be described later.

The signal composing circuit 14 has an output 46 connected, on one hand, through a changeover switch 50 to an output terminal 48 of this apparatus and, on the other hand, it is connected to a changeover switch 50 via a delay circuit 52. The changeover switch 50, like the switch 40, alternately changes the connecting state at a frequency equal to half the frequency fV of the vertical sync signal. That is, on receiving the output 46 from the signal composing circuit 14, the changeover switch 50 sets the counting state in order to supply a signal (for an odd-numbered field) which has not passed the delay circuit 52 and, at the same time, to configure an even-numbered field with signals which have passed the delay circuit 52. Metal-oxide-semiconductor switches, for example, may be advantageously utilized to form these changeover switches 28, 30, 40 and 50.

The delay circuit 52 provides a delay time substantially equal to half the horizontal scanning time period (1H). The changeover switching operation and the 0.5H delay time held supply a 0.5H delay between the odd-numbered and even-numbered fields in the processing for converting field video signals into frame video signals as described above. A composite video signal thus generated by adding the luminance signal to the color difference signal in the signal composing circuit 14 is, as will be described later, delivered from the output terminal 48 as a correct frame video signal with the help of the changeover switching operation and delay time so as to conform to a standard color television format, for example, NTSC system, and is delivered to a video display device such as a video monitor.

As an example, an embodiment conforming to the NTSC standard system will be described in accordance with the present invention. In this apparatus, onefield video signals delivered from the demodulators 10Y and 10C include picture element or pixel signals equivalent to 262.5H, and the Y signal included therein are fed to the input 12Y of the signal composing circuit 14. The C signals are converted into the color difference signals R-Y and B-Y by use of the delay circuit 26 and changeover switches 28 and 30 so as to undergo the balanced modulation in the balanced modulator 20, and the resultant signals are delivered to the other input 16 of the signal composing circuit 14.

Two chrominance subcarriers fscA and fscB each having frequency fsc and having been passed through the phase shifter 42 so as to have a phase difference of 90 degrees therebetween are supplied to the input terminal 34 and 36 of the balanced modulator 20, respectively. The balanced modulator 20 carries out the balanced modulation on these input signals with the color difference signals R-Y and B-Y. The signal fsc received on the terminal 38 is delivered to the phase shifter 44 and changeover switch 40 in order to generate the chrominance subcarriers fscA and fscB to be fed to the balanced modulator 20. The changeover switch 40 alternately changes its connecting state synchronous with the vertical sync signal, that is, at frequency fV/2 as described before. For an odd field, the signal fsc supplied to the terminal 38 is directly fed to the input 34 of the balanced modulator 20 and to the phase shifter 42; whereas, for an even-numbered field, only the output signal fsc1 that has undergone the phase shift in the phase shifter 44 is delivered to the input 34 of the balanced modulator 20 and to the phase shifter 42.

The color difference signal that has undergone the balanced modulation with the chrominance subcarriers fscA and fscB whose phases have been thus adjusted is fed to the input 16 of the signal composing circuit 14 so as to be combined with the Y signal received on the other input 14, so that the composite color video signal is fed to the output 46. For the composite color signal, the 0.5H delay is provided between the odd-numbered and even-numbered fields by use of the delay circuit 52 and changeover switch 50 as described before. This provision enables this apparatus to deliver the correct NTSC signals from the output terminal 48. That is, the one-field video signals are converted into the correct NTSC signals which have undergone the interlaced scanning, where each frame comprises two fields.

Figure 1:
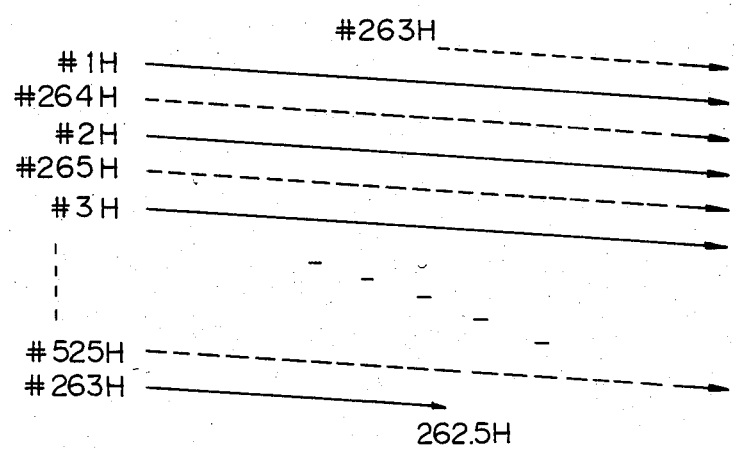
FIG. 1 is a schematic diagram illustrating the interlaced scanning of a picture according to the NTSC system, useful for understanding the principle of the present invention.

In more detail, the last scanning line, #263H in the odd-numbered field terminates at its central position and continues to the central position of the first scanning line in the even-numbered field as illustrated in FIG. 1. Video signals for the even-numbered field are delivered from the output terminal of the delay circuit 52 when the contact point of the switch 50 is set to the side of the delay circuit 52, and since these signals are delayed by 0.5H with respect to those for the odd-numbered field, the same information is carried in the first and second half portions of the scanning line #263H. However, the latter half portion is blanked in ordinary cases.

The time when the field video signal supplied from an external device such as a magnetic disk, not shown, to the demodulators 10Y and 10C returns to the top of the first scanning line of a field corresponds to the top of #264H in the even-numbered field for the video signals transferred from the terminal 48. Consequently, the same information is stored in the #264H of the even-numbered field and in the #1H of the odd-numbered field. This is also the case for the subsequent scanning lines, that is, two associated fields contain the same data. A frame that has undergone the interlaced scanning is thus configured. When the scanning operation of the last scanning line #525H in the even-numbered field is finished during a vertical blanking time period, the switch 50 is immediately set to be connected to the output 46 of the signal composing circuit 14 so that video signals to which the 0.5H delay has not been applied are fed to the output 48, thereby allowing the signal recording operation to return from the even-numbered field to the odd-numbered field.

The input terminal 34 of the balanced modulator 20 and the phase shifter 42 are alternately supplied with the chrominance subcarriers fsc and fsc1 whose phases are shifted by 90 degrees for each field by use of the phase shifter 44. These operations will be readily understood as follows.

In the NTSC system, as known widely, the following relationships are satisfied for the chrominance subcarrier fsc, horizontal scanning frequency fH, and vertical scanning frequency fV.

$$2 \text{ fss}/455 = \text{fH}$$

$$2 \text{ fH}/525 = \text{fV}$$

Figure 3:
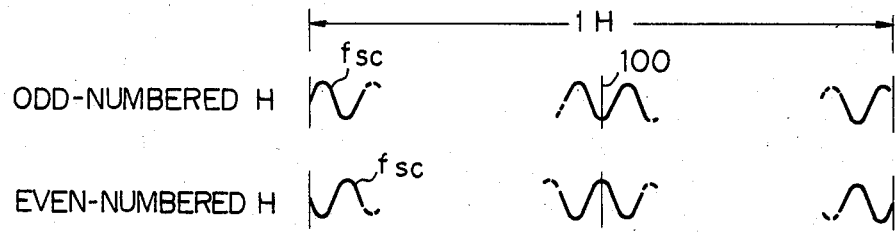
FIG. 3 to FIG. 7 illustrate waveforms of chrominance subcarrier and carrier chrominance signal useful for understanding the operations of the embodiment shown in FIG. 2; where
Figure 4:
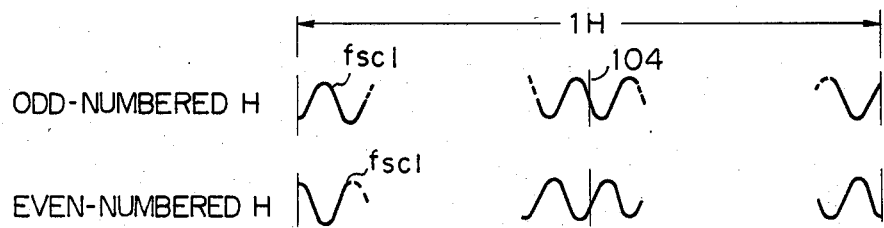

That is, the phase of the chrominance subcarrier fsc received on the terminal 38 is reversed by 180 degrees for each 1H time period as illustrated with the waveforms for the 1H time period in FIG. 3. The resultant signal is utilized to generate the subcarriers fscA and fscB to be processed by the balanced modulator 20 for the oddnumbered field. FIG. 4 depicts the waveform of the signal fsc1 delivered from the phase shifter 44 after undergone a −90° phase shift therein. This output signal is transferred as the source of the subcarriers fscA and fscB to be used in the balanced modulator 20 for the evennumbered field.

Figure 5:
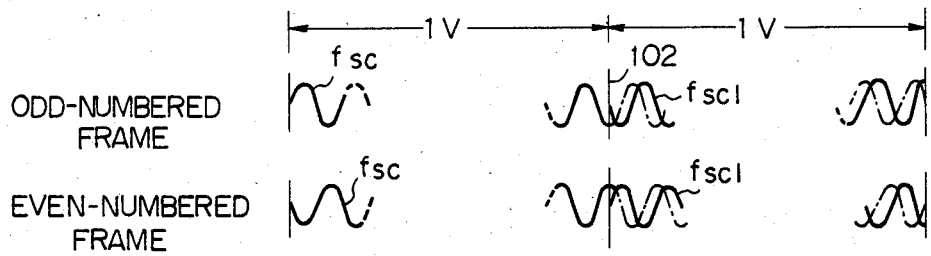

These operations are repeated for each frame consisting of an odd number (525) of scanning lines in which the phase of chrominance subcarrier is reversed by 180 degrees for each 1H time period so that subcarriers fscA and fscB to be processed in the balanced modulator 20 develop the phase state recurring for every two frames as illustrated in FIG. 5. Chain lines in FIG. 5 depict waveforms which should be obtained on the assumption that the switch 40 does not carry out the changeover operation so that the balanced modulator 20 and phase shifter 42 are always supplied with the subcarrier fsc received on the input terminal 38.

Figure 6:
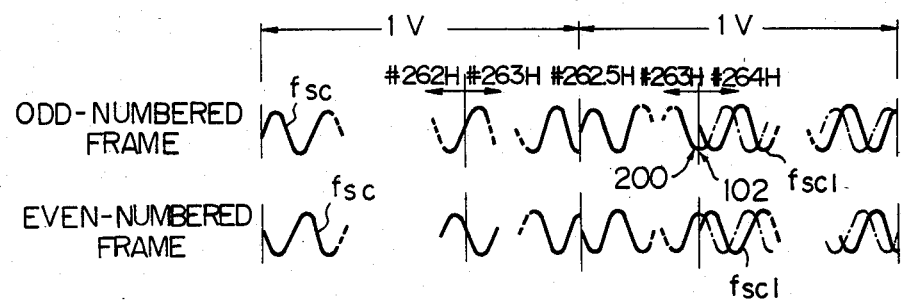
Figure 7:
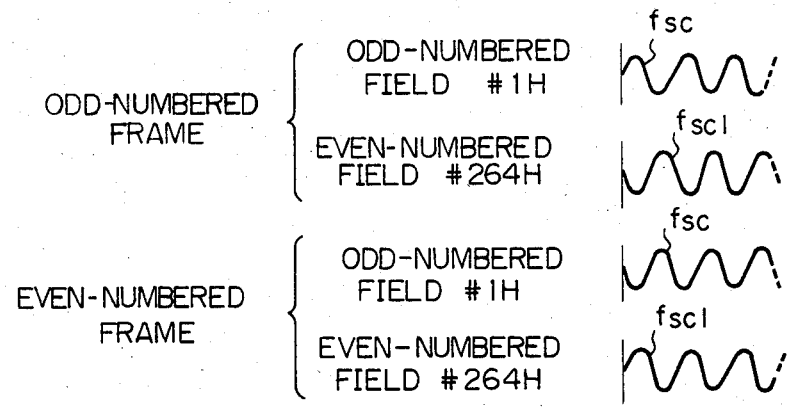

First of all, the chrominance signal contained in the signal of the scanning line 1H for the odd-numbered frame is generated from the chrominance subcarrier with the phase shown in upper-left corner of FIG. 6 illustrating the phase in the beginning portion of one of the chrominance subcarriers, for example, fscA to be utilized as the source of the chrominance signal in a composite video signal. On a transition from the odd-numbered field to the even-numbered field, the switch 40 is set to the connector for use with the phase shifter 44 in order to apply a 90° delay to the chrominance subcarriers fscA and fscB to be supplied to the balanced modulator 20; hence, the waveform of fsc1 is obtained as illustrated for a 1H time period in FIG. 4. Since the switch 50 is set to be connected to the delay circuit 52 at the same time, the first scanning line of the even-numbered field and the first half of the last scanning line #263H in the odd-numbered field contain the same video signals transferred from the output 48 of this apparatus. Consequently, at the end of #263 in the even-numbered field, the chrominance signal included in the composite video signal has a phase depicted at the central point 100 (that is, point 200 in FIG. 6) of odd-numbered scanning line shown in FIG. 3. This signal is actually blanked in the video signal delivered from the output terminal 48.

Beginning from the top of #264H in the even-numbered field, a signal that has undergone the balanced modulation with the signal Fsc1, whose phase has been shifted by −90 degrees in the phase shifter 44 is supplied from the delay circuit 52. A video signal containing chrominance signals which are depicted in the right portions of the odd-numbered frames in FIGS. 5 and 6, and which have such phases as depicted at the start point 102 of the even-numbered field are delivered from the delay circuit 52 to the apparatus output 48 via the switch 50. The chrominance signal of the #264H has, as is clear from FIG. 6, an opposite phase as compared with that of the #1H in the odd-numbered frame in this case.

Similarly, on a transition from an even-numbered field of an odd-numbered frame to an odd-numbered field of the subsequent even-numbered frame, the switch 40 is set to be directly connected to the terminal 38 during the vertical blanking time period. The phases of the chrominance subcarriers fscA and fscB to be fed to the balanced modulator 20 are advanced by 90 degrees, so that the waveforms depicted for the 1H time period in FIG. 3 are developed. At the same time, the switch 50 is set to the contact for the output 46 of the signal composing circuit 14, the output terminal 48 of this apparatus supplies the first scanning line of the odd-numbered field with a #1H video signal which has not undergone the delay.

At the end of the #525H in the preceding even-numbered field, the chrominance subcarrier fsc1 has a phase indicated at the intermediate point 104, which functions as the terminating point, due to the 0.5H delay of the odd-numbered scanning line illustrated in FIG. 4; therefore, the continuous chrominance signal having a phase depicted in the lower portion of FIGS. 5 and 6 is supplied beginning from the #1H of the odd-numbered field in the subsequent even-numbered frame. This chrominance signal is superimposed onto the video signal, and the resultant signal is directly supplied from the output 46 of the signal composing circuit 14 to the output terminal 48.

From the top of #264H of the subsequent even-numbered field in this even-numbered frame, a signal that has undergone the balanced modulation with the subcarrier fsc1, whose phase has been shifted by −90 degrees in the phase shifter 44, is delivered to the signal composing circuit 14. The signal obtained from the signal composing circiut 14 is delivered through the delay circuit 52 to the output 48. Consequently, the chrominance signals depicted in the even-numbered frames in FIGS. 5 and 6 are supplied from the output terminal 48 in the similar manner.

The video signals delivered from the apparatus output 48 as described above retain the frequency interleaved relationship therebetween conforming to the NTSC system as illustrated in FIG. 76 depicting phases of signals, for example, fscA to be used as the source of a chrominance signal for the first scanning line in each field. The luminance fluctuation in accordance with the chrominance signal in the composite video signal is therefore cancelled with each other between frames, thus the resultant bright dots are suppressed in the reproduced picture. In addition, the synchronization failure due to the phase shift in the chrominance signal is not caused on a video monitor connected to the output terminal 48.

These effects will be explained on the assumption that the apparatus is configured in such a manner that the phase shifter 44 and switch 40 are not provided and that the chrominance subcarrier fsc received on the input terminal 38 is directly fed to the input 34 of the balanced modulator 20 and the shifter 42. Since there does not exist the 90° phase shift in the chrominance signals between each associated field, such chrominance signals would have phase illustrated with chain lines in FIGS. 5 and 6. Consequently, for the even-numbered field, the phase of the chrominance signal in the video signal supplied from the output terminal 48 is shifted 90 degrees as compared with that of the chrominance signal delivered from this apparatus of the present invention, which results in a color synchronization failure at the beginning of such an even-numbered field in the monitor equipment. In accordance with the present invention, however, these drawbacks do not take place because the phase of the chrominance subcarrier is controlled as described before.

In accordance with the present invention, two systems of delay circuits each providing a 0.5H delay time will be dispensed with for converting field video signals into frame video signals so as to simplify the circuit configuration. This provision also requires a single changeover switch to be added for the respective fields, thereby enabling a simple adjustment to suppress the occurrence of flicker in the reproduced picture.

Additionally, since the phase of the chrominance subcarrier is controlled synchronous with each field, the luminance fluctuation taking place in the reproduced picture according to the chrominance signal contained in the composite video signal will be sufficiently cancelled between successive frames, so that resultant dots do not appear in the reproduced picture. Furthermore, the synchronization failure due to phase shift in the chrominance signal does not occur on the video monitor connected to the output of the apparatus of the present invention.

While this invention has been described in terms of a specific illustrative embodiment, it is to be understood to be susceptible of modification by those skilled in the art within the spirit and scope of the appended claims.

What is claimed is:

1. An apparatus for converting field video signals into frame video signals comprising:

modulator means for modulating a chrominance subcarrier with a color signal contained in a field video signal;

signal composing means for combining the modulated subcarrier with a luminance signal of the field video signal;

signal converter means for producing a frame video signal including interlaced fields with a time delay applied to alternative ones of the fields of output signals delivered from said signal composing means, said time delay being substantially equal in period to half a horizontal scanning time period of the fields;

signal generator means, operative in response to a first signal which is substantially equal in frequency to the chrominance subcarrier, for generating a second signal which is shifter in phase by substantially 90 degrees with respect to said first signal; and switching means for alternately selecting said first and second signals for each field, supplying said modulator means with the selected one of said first and second signals as the chrominance subcarrier.

2. An apparatus in accordance with claim 1, wherein said color signal comprises color difference signals, and the apparatus further comprises means, operative in response to line sequential color difference signals contained in the field video signal, for producing the color difference signals simultaneously in parallel and providing said modulator means with the color difference signals as the color signal.

3. An apparatus in accordance with claim 2, wherein said modulator means comprises balanced modulator means for effecting balanced modulation on the chrominance subcarrier with the color difference signals.

4. An apparatus for converting field video signals into frame video signals conforming a standard color television signal format comprising:
   means operative in response to line sequential color difference signals contained in a field video signal for producing color difference signals simultaneously in parallel;
   balanced modulator means for effecting balanced modulation on a chrominance subcarrier with the color difference signals produced from said means for producing color difference signals;
   signal composing means for combining the modulated chrominance subcarrier with a luminance signal of the field video signal;
   signal converter means for producing a frame video signal, including interlaced fields, with a time delay applied to alternative one of the fields of output signals from said signal composing means in accordance with a standard color television signal format, the time delay being set substantially equal in period to half a horizontal scanning time period of the fields;
   signal generator means operative in response to a first signal which is substantially equal in frequency to the chrominance subcarrier for generating a second signal which is shifted in phase by substantially 90 degrees with respect to the first signal; and
   switching means for alternately selecting said first and second signals for each field to supply said modulator means with the selected one of the first and second signals as the chrominance subcarrier.

* * * * *